United States Patent [19]

Smith

[11] 4,087,103
[45] May 2, 1978

[54] INDEPENDENT SUSPENSION SYSTEM

[75] Inventor: Gary L. Smith, Pontiac, Mich.

[73] Assignee: General Motors Corporation, Detroit, Mich.

[21] Appl. No.: 745,832

[22] Filed: Nov. 29, 1976

[51] Int. Cl.² .......................... B62D 7/06; F16F 1/38
[52] U.S. Cl. ................................... 280/96.1; 280/662; 280/701; 267/57.1 A
[58] Field of Search ....................... 280/96.1, 662, 663, 280/664, 665, 670, 671, 673, 691, 695, 696, 697, 700, 701, 237 R, 237 A, 238; 267/57.1 A, 57.1 R, 63 A, 63 R

[56] References Cited

U.S. PATENT DOCUMENTS

| | | | |
|---|---|---|---|
| 2,862,741 | 12/1958 | Baker | 280/96.1 X |
| 3,147,964 | 9/1964 | Wolf | 267/57.1 A |
| 3,304,136 | 2/1967 | Muller | 308/238 |
| 3,572,677 | 12/1968 | Damon | 267/57.1 R |

FOREIGN PATENT DOCUMENTS

| | | | |
|---|---|---|---|
| 1,253,786 | 1/1961 | France | 280/701 |

*Primary Examiner*—Robert R. Song
*Assistant Examiner*—Donn McGiehan
*Attorney, Agent, or Firm*—John P. Moran

[57] ABSTRACT

An independently sprung front wheel assembly including a frame, a steering knuckle and associated road wheel, a control arm pivotally connected at its outer end to the steering knuckle and at its inner ends to a shaft mounted in a pair of spaced clamp members secured to the frame, a coil spring mounted between the control arm and the frame, and a pair of eccentric elastomeric bushings mounted around the shaft within the respective clamps, each bushing having a vertically oriented scalloped void or cut-out formed in the side thereof facing the wheel (1) for providing high deflection in the horizontal plane and low deflection in the vertical plane of the shaft and, hence, the control arm relative to the clamp members during road impact conditions, to substantially isolate the frame from such impacts, and (2) for controlling the compliance center about which the lower control arm pivots to minimize steering reaction that might be caused by braking and road impact conditions.

7 Claims, 4 Drawing Figures

INDEPENDENT SUSPENSION SYSTEM

This invention relates generally to independent front suspension systems and, more particularly, to an improved arrangement for mounting a lower control arm to a vehicular frame.

It has been generally customary to rigidly connect the control arm shaft of a lower control arm of the type normally used on recreational and/or light duty truck vehicles to the unitized body and frame side rails. In order to provide improved riding characteristics for such vehicles, it has heretofore been customary to incorporate resiliently mounted frames in lieu of a unitized body and frame.

Accordingly, an object of the invention is to provide an improved, simplified, economical, and efficiently elastomeric isolation means for use with the lower control arm shaft of an independent front wheel suspension system to improve the riding characteristics of the vehicle involved.

Another object of the invention is to provide a front suspension system, including particularly shaped eccentric elastomeric bushings for use in conjunction with the clamp means securing a lower control arm shaft to a vehicular frame for improved riding characteristics when road impact loads are encountered and during braking.

A further object of the invention is to provide a front suspension system, including eccentric elastomeric bushings for use in conjunction with the clamps securing a lower control arm shaft to a vehicular frame, the bushings having thick upper and lower wall portions and thinner side wall portions of different effective thicknesses with the side facing the steering knuckle having the thinnest wall portion as a result of a scalloped void or cut-out formed therein to provide a high horizontal deflection and low vertical deflection of the lower control arm for improving the ride during road impact conditions.

Still another object of the invention is to provide an independently sprung front wheel assembly including a frame, a steering knuckle and associated road wheel, a control arm pivotally connected at its inner ends via a shaft and a pair of intermediate, spaced clamps to the frame and at its outer end to the steering knuckle, a coil spring mounted between the control arm and the frame, and eccentric elastomeric bushings mounted around the shaft within the respective clamps and having thick top and bottom wall portions and thin side portions, with the side facing the steering knuckle having the thinnest effective thickness by virtue of a scalloped or arcuate shaped cut-out portion formed therein (1) for providing high deflection in the horizontal plane and low deflection in the vertical plane of the wheel and control arm relative to the frame during road impact conditions to substantially isolate the frame from such impacts, and (2) for controlling the compliance center about which the lower control arm pivots.

Other objects and advantages of this invention will be more apparent when reference is made to the following description and accompanying drawings, wherein.

Figure 1:
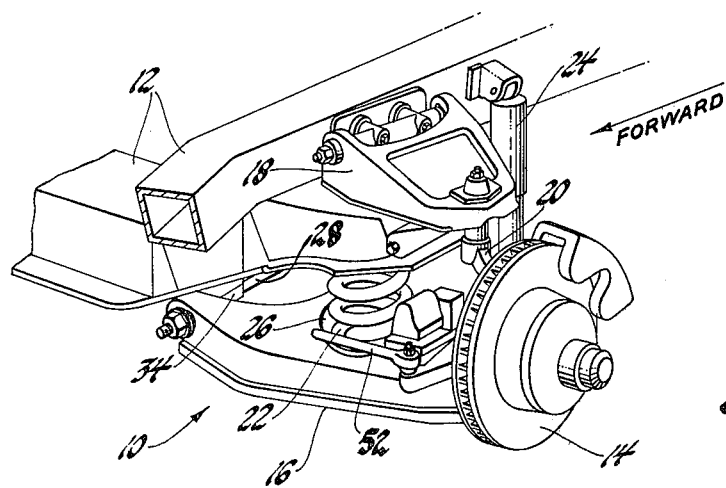
FIG. 1 is a fragmentary perspective view of an independent front suspension system embodying the invention.

Referring now to the drawings in greater detail, FIG. 1 illustrates a conventional independent front suspension system 10 operatively connected between a vehicular frame 12 and a steerable road wheel 14. The suspension system 10 typically includes lower and upper wishbone or "Y" shaped control arms 16 and 18, respectively, each pivotally connected at the inner ends to the frame 12 and at the outer ends to a steering knuckle 20 at a point substantially along the vertical centerline of the road wheel 14. The wheel 14 is rotatably mounted on the spindle 21 portion of the steering knuckle 20. A coil spring 22 and a shock absorber 24 are mounted between the frame 12 and a central seat 26 and a rear side surface (not shown), respectively, of the lower control arm 16.

Figure 2:
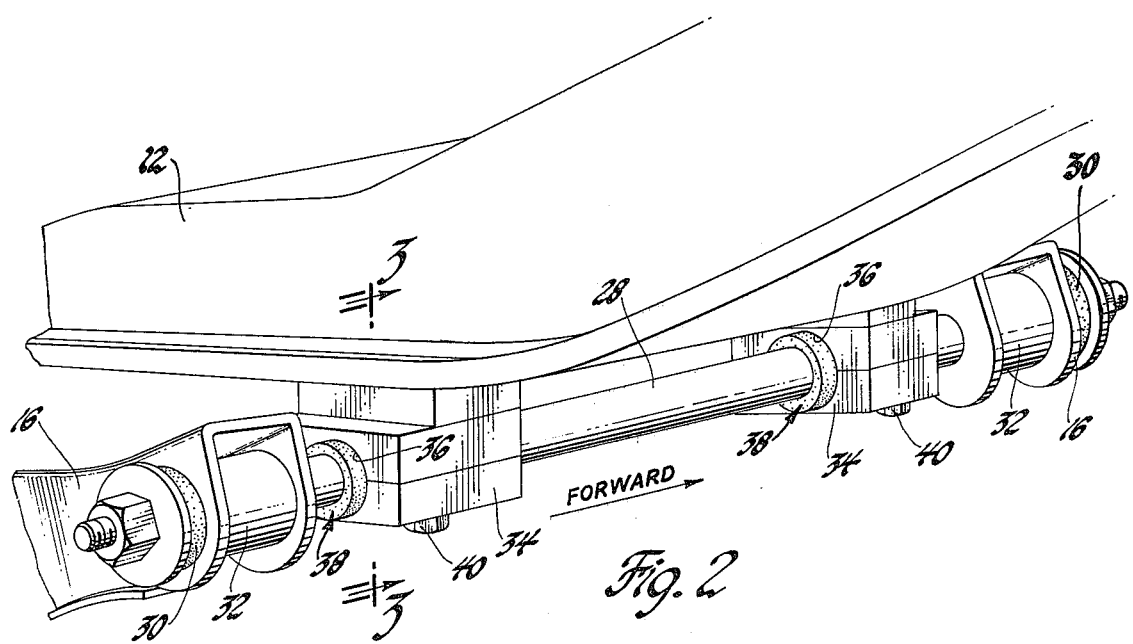
FIG. 2 is an enlarged fragmentary perspective view of a portion of the FIG. 1 structure.
Figure 3:
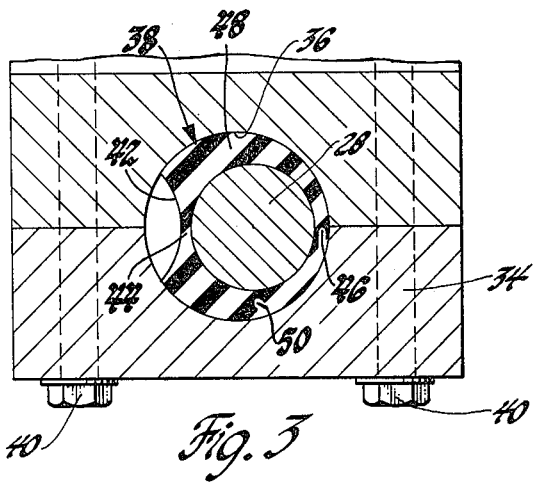
FIG. 3 is an enlarged fragmentary cross-sectional view taken along the plane of the line 3—3 of FIG. 2, and looking in the direction of the arrows.

As may be noted in FIG. 2, the inner ends of the lower control arm 16 are elastically and pivotally supported on the end portions of a control arm shaft 28 by an elastomeric bushing 30 mounted within a metal spacer sleeve 32. A pair of mounting brackets or clamps 34, having upper and lower halves, located adjacent the respective pivotal connections of the ends of the lower control arm 16 and the shaft 28 serve to secure the shaft 28 to the frame 12. As may be noted in Matthews U.S. Pat. No. 2,171,157, mounting brackets or clamps have typically connected control arm shafts, such as the shaft 28, to the frame in a rigid manner. It is a feature of this invention to use a pair of spaced clamps 34 which have enlarged bores 36 formed therethrough such that eccentric elastomeric bushings 38 having a shape to be described may be mounted between the shaft 28 and the respective clamps 34. Suitable fasteners, such as bolts 40, secure the clamps 34 to the frame 12.

Figure 4:
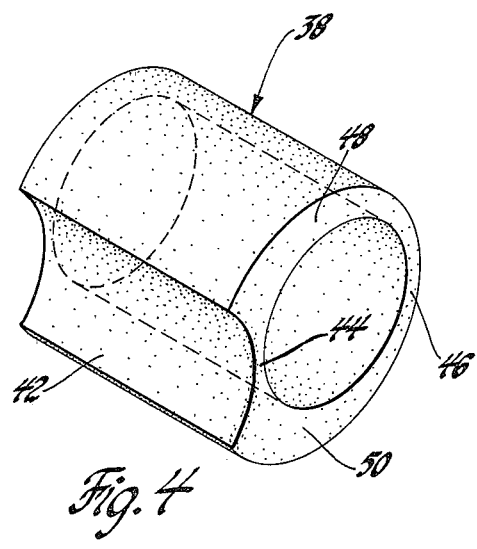
FIG. 4 is an enlarged perspective view of a component of the FIG. 2 structure.

As better noted in FIG. 4, a contoured surface, such as a scalloped or arcuate-shaped cut-out surface 42, is formed in the outer side wall 44 of each of the eccentric elastomeric bushings 38, providing an effective thickness less than that of the oppositely inner side wall 46. The bushings 38 are mounted so as to have the scalloped surfaces 42 thereof facing the steering knuckle 20, the thinner, voided side 44 serving to provide a large horizontal deflection of the shaft 28 within the front clamp member 34 during road impact and braking conditions, as compared to the relatively small vertical deflection due to the thicker top and bottom sections 48 and 50 of the bushing 38.

More specifically, during uneven road load and braking conditions, the force on the lower control arm 16 has both vertical and horizontal vectors. For example, the reaction to contact of the tire against an uneven road surface urges the lower control arm 16 to horizontally pivot about the so-called compliance center between the clamps 34. If the elastomeric bushings 38 were concentric, with identical front and rear side walls, the compliance center would be at the midpoint therebetween. However, with the above described voided and, hence, softest section of the elastomeric bushings 38 facing the plane of the wheel 14, upon impact, the resultant horizontal movement is such that the shaft 28 within the front clamp 34 moves outwardly, forcing the thin wall 44 of the front bushing 38 through the voided area adjacent the scalloped surface 42, limited by contact with the adjacent inner surface of the clamp 34. At the same time, the rear wall 46 of the rear bushing 38 is compressed only slightly, causing the compliance center to be located near the rear clamp 34. The horizontal pivotal movement of the lower control arm 16 about such center serves to greatly reduce the impact feel through the frame 12 and the vehicle body to the operator. Vertical travel of the tire and wheel 14 is absorbed by the coil spring 22 and the shock absorber 24. The high vertical compression rate of the bushing 38 maintains the spatial relationship between the control arm shaft 28 and the frame 12.

The rear clamp 34 and elastomeric bushing 38 may be a predetermined amount longer than the front clamp 34 and elastomeric bushing 38 to compensate for the additional loading on the rear portion of the lower control arm due to the shock absorber 24 being secured to the rear side surface of the lower control arm.

It is apparent that the invention provides a relatively simple elastomeric arrangement to supplement an otherwise conventional independent front suspension system for effectively isolating the frame from road impact and braking conditions.

It is apparent that, for particular vehicular applications, the elastomeric bushing 38 could be oriented such that the void or space is facing inward or away from the wheel to selectively provide a compliance center adjacent the front bushing.

It is also apparent that, for particular vehicular applications, the elastomeric bushings 38 could be adapted to the upper control arm 18, as well as to the lower control arm 16.

While but one embodiment of the invention has been shown and described, other modifications thereof are possible.

What is claimed is:

1. In combination with a vehicle frame, an independently sprung front wheel assembly comprising a wishbone-shaped control arm having an outer end and a pair of spaced apart inner ends; a steering knuckle and associated road wheel mounted on the outer end of said control arm; a vertically oriented coil spring disposed between said control arm and said frame; a horizontally oriented shaft; means connecting said spaced apart inner ends of said control arm to the ends of said shaft for pivotal movement about said shaft; front and rear clamp members having bores formed therethrough a predetermined diameter larger than the diameter of said shaft and surrounding said shaft intermediate said inner ends; fastener means for rigidly securing each of said front and rear clamp members to said frame; and a pair of spaced apart eccentric elastomeric bushings mounted on said shaft and confined in the respective bores of said front and rear clamp members, said eccentric elastomeric bushings having thicker top and bottom thicknesses providing a small vertical deflection of said shaft relative to said clamp members, and thinner side thicknesses, with the side facing said road wheel being reduced in thickness by a vertically oriented arcuate cut-out providing a large horizontal deflection of said shaft relative to said clamp members during road impact conditions, thereby substantially isolating said frame from such impacts.

2. In combination with a vehicle frame, an independently sprung front wheel assembly comprising a wishbone-shaped control arm having an outer end and a pair of spaced apart inner ends; a steering knuckle and associated road wheel mounted on the outer end of said control arm; a vertically oriented coil spring disposed between said control arm and said frame; a horizontally oriented shaft; means connecting said spaced apart inner ends of said control arm to the ends of said shaft for pivotal movement about said shaft, front and rear clamp members having bores formed therethrough a predetermined diameter larger than the diameter of said shaft and surrounding said shaft intermediate said inner ends; fastener means for rigidly securing each of said front and rear clamp members to said frame; and a pair of spaced apart eccentric elastomeric bushings mounted on said shaft and confined in the respective bores of said front and rear clamp members; said eccentric elastomeric bushings having equal thicker top and bottom thicknesses providing a small vertical deflection of said shaft relative to said clamp members, and unequal thinner side thicknesses, with the side facing said road wheel being reduced in thickness by a vertically oriented arcuate cut-out providing a larger horizontal deflection outwardly at the front elastomeric bushing than the deflection inwardly at the rear elastomeric bushing of said shaft relative to said clamp members, thereby selectively locating the compliance center of the lower control arm adjacent the rear elastomeric bushing by braking.

3. In combination with a vehicle frame, an independently sprung front wheel assembly comprising a wishbone-shaped control arm having an outer end and a pair of spaced apart inner ends; a steering knuckle and associated road wheel mounted on the outer end of said control arm; a vertically oriented coil spring disposed between said control arm and said frame; a horizontally oriented shaft; means connecting said spaced apart inner ends of said control arm to the ends of said shaft for pivotal movement about said shaft; front and rear clamp members having bores formed therethrough a predetermined diameter larger than the diameter of said shaft and surrounding said shaft intermediate said inner ends; fastener means for rigidly securing each of said front and rear clamp members to said frame; and a pair of spaced apart eccentric elastomeric bushings mounted on said shaft and confined in the respective bores of said front and rear clamp members, said eccentric elastomeric bushings having equal thicker top and bottom thicknesses providing a small vertical deflection of said shaft relative to said clamp members, and unequal thinner side thicknesses, with the side facing said road wheel being reduced in thickness by a vertically oriented arcuate cut-out providing a larger horizontal deflection outwardly at the front elastomeric bushing than the deflection inwardly at the rear elastomeric bushing of said shaft relative to said clamp members, during road impact conditions, thereby substantially isolating said frame from such impacts and selectively locating the compliance center of the lower control arm adjacent the rear elastomeric bushing minimize steering reaction caused by braking and road impact conditions.

4. In combination with a vehicle frame, an independently sprung front wheel assembly comprising a wishbone-shaped control arm having an outer end and a pair of spaced apart inner ends; a steering knuckle and associated road wheel mounted on the outer end of said control arm; steering linkage pivotally connected to a steering arm formed on a forward portion of said steering knuckle; a vertically oriented coil spring and a shock absorber disposed between said control arm and said frame; a horizontally oriented shaft; means connecting said spaced apart inner ends of said control arm to the ends of said shaft for pivotal movement about said shaft; front and rear clamp members having bores formed therethrough a predetermined diameter larger than the diameter of said shaft and surrounding said shaft intermediate said inner ends; fastener means for rigidly securing each of said front and rear clamp members to said frame; and a pair of spaced apart eccentric elastomeric bushings mounted on said shaft and confined in the respective bores of said front and rear clamp members, said eccentric elastomeric bushings having equal thicker top and bottom thicknesses providing a small vertical deflection of said shaft relative to said clamp members, and thereby maintaining a predetermined spatial relationship between said control arm and said frame, and unequal thinner side thicknesses, with the side facing said road wheel being reduced in thickness by a vertically oriented arcuate cut-out providing a larger horizontal deflection outwardly at the front elastomeric bushing than the deflection inwardly at the rear elastomeric bushing of said shaft relative to said clamp members during road impact conditions, thereby substantially isolating said frame from such impacts and selectively locating the compliance center of the lower control arm adjacent the rear elastomeric bushing.

5. In combination with a vehicle frame, an independently sprung front wheel assembly comprising a wishbone-shaped control arm having an outer end and a pair of spaced apart inner ends; a steering knuckle and associated road wheel mounted on the outer end of said control arm; a vertically oriented coil spring disposed between said control arm and said frame; a horizontally oriented shaft; means connecting said spaced apart inner ends of said control arm to the ends of said shaft for pivotal movement about said shaft; clamping means having a bore formed therethrough a predetermined diameter larger than the diameter of said shaft and surrounding said shaft intermediate said inner ends; fastener means for rigidly securing said clamping means to said frame; and a pair of spaced apart eccentric elastomeric bushings mounted on said shaft and confined in the bore of said clamping means, said eccentric elastomeric bushings having thicker top and bottom thicknesses providing a small vertical deflection of said shaft relative to said clamping means, and thinner side thicknesses, with the side facing said road wheel being reduced in thickness by a vertically oriented contoured cut-out providing a large horizontal deflection of said shaft relative to said clamping means during road impact conditions, thereby substantially isolating said frame from such impacts.

6. In combination with a vehicle frame, an independently sprung front wheel assembly comprising a wishbone-shaped control arm having an outer end and a pair of spaced apart inner ends; a steering knuckle and associated road wheel mounted on the outer end of said control arm; a vertically oriented coil spring disposed between said control arm and said frame; a horizontally oriented shaft; means connecting said spaced apart inner ends of said control arm to the ends of said shaft for pivotal movement about said shaft; front and rear clamp members having bores formed therethrough a predetermined diameter larger than the diameter of said shaft and surrounding said shaft intermediate said inner ends; fastener means for rigidly securing each of said front and rear clamp members to said frame; and a pair of spaced apart eccentric elastomeric bushings mounted on said shaft and confined in the respective bores of said front and rear clamp members; said eccentric elastomeric bushings having equal thicker top and bottom thicknesses providing a small vertical deflection of said shaft relative to said clamp members, and unequal thinner side thicknesses, with one side thereof being reduced in thickness by a vertically oriented scalloped cut-out providing a larger horizontal deflection in one direction at one elastomeric bushing than the deflection in the other direction at the other elastomeric bushing of said shaft relative to said clamp members, thereby selectively locating the compliance center of the lower control arm adjacent the other elastomeric bushing.

7. In combination with a vehicle frame, an independently sprung front wheel assembly comprising a wishbone-shaped control arm having an outer end and a pair of spaced apart inner ends; a steering knuckle and associated road wheel mounted on the outer end of said control arm; a vertically oriented coil spring disposed between said control arm and said frame; a horizontally oriented shaft; means connecting said spaced apart inner ends of said control arm to the ends of said shaft for pivotal movement about said shaft; front and rear clamp members having bores formed therethrough a predetermined diameter larger than the diameter of said shaft and surrounding said shaft intermediate said inner ends; fastener means for rigidly securing each of said front and rear clamp members to said frame; and a pair of spaced apart eccentric elastomeric bushings mounted on said shaft and confined in the respective bores of said front and rear clamp members, said eccentric elastomeric bushings having equal thicker top and bottom thicknesses providing a small vertical deflection of said shaft relative to said clamp members, and unequal thinner side thicknesses, with one side thereof being reduced in thickness by a vertically oriented arcuate cut-out providing a larger horizontal deflection in one direction at one elastomeric bushing than the deflection in the other direction at the other elastomeric bushing of said shaft relative to said clamp members, during road impact conditions, thereby substantially isolating said frame from such impacts and selectively locating the compliance center of the lower control arm adjacent the other elastomeric bushing.

* * * * *

UNITED STATES PATENT AND TRADEMARK OFFICE
CERTIFICATE OF CORRECTION

PATENT NO. : 4,087,103
DATED : May 2, 1978
INVENTOR(S) : Gary L. Smith

It is certified that error appears in the above-identified patent and that said Letters Patent are hereby corrected as shown below:

Column 1, line 16, "efficiently" should be -- efficient --.

Column 2, line 43, after "oppositely" insert -- disposed --.

Claim 3, lines 55 and 56, after "bushing" delete -- minimize steering reaction caused by braking and road impact conditions --.

Signed and Sealed this

Twenty-first Day of November 1978

[SEAL]

Attest:

RUTH C. MASON
*Attesting Officer*

DONALD W. BANNER
*Commissioner of Patents and Trademarks*